United States Patent
Maeda (10) Patent No.: US 10,782,601 B2
(45) Date of Patent: Sep. 22, 2020

(54) LIGHT SOURCE DEVICE INCLUDING REFLECTIVE FILM REFLECTING AT LEAST PART OF EXCITATION LIGHT, AND PROJECTOR-TYPE IMAGE DISPLAY APPARATUS

(71) Applicant: PANASONIC INTELLECTUAL PROPERTY MANAGEMENT CO., LTD., Osaka (JP)

(72) Inventor: Makoto Maeda, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 84 days.

(21) Appl. No.: 15/453,339

(22) Filed: Mar. 8, 2017

(65) Prior Publication Data

US 2017/0269462 A1 Sep. 21, 2017

(30) Foreign Application Priority Data

Mar. 15, 2016 (JP) ................................. 2016-050335

(51) Int. Cl.
G03B 21/20 (2006.01)
G02B 5/26 (2006.01)
G02B 27/30 (2006.01)
G02B 27/14 (2006.01)
H04N 9/31 (2006.01)
G02B 26/00 (2006.01)
G03B 33/08 (2006.01)

(52) U.S. Cl.
CPC ............ *G03B 21/204* (2013.01); *G02B 5/26* (2013.01); *G02B 26/008* (2013.01);
(Continued)

(58) Field of Classification Search
CPC .... G02B 26/008; G02B 27/141; G02B 27/30; G02B 5/26; G03B 21/204; H04N 9/3114
See application file for complete search history.

(56) References Cited

U.S. PATENT DOCUMENTS

2012/0106126 A1   5/2012 Nojima et al.
2013/0271954 A1* 10/2013 Li ....................... H04N 9/3114
                                                              362/84

(Continued)

FOREIGN PATENT DOCUMENTS

| CN | 105190432 A | 12/2015 |
| JP | 2012-098442 A | 5/2012 |
| JP | 2014-160227 A | 9/2014 |

OTHER PUBLICATIONS

English Translation of Chinese Search Report dated Jun. 9, 2020 for the related Chinese Patent Application No. 201710144143.3.

(Continued)

*Primary Examiner* — Michelle M Iacoletti
*Assistant Examiner* — Magda Cruz
(74) *Attorney, Agent, or Firm* — McDermott Will & Emery LLP (57) ABSTRACT

A light source device includes a solid light source, a transmissive fluorescent plate having a phosphor that is excited by excitation light for emitting fluorescent light in a traveling direction of the excitation light, and a color filter plate that cuts a part of a wavelength region of light supplied from the fluorescent plate for trimming the light into desirable color light. The light source device further includes a first reflective film disposed on a light path extending from the fluorescent plate to the color filter plate for reflecting at least a part of the excitation light.

8 Claims, 8 Drawing Sheets

(52) U.S. Cl.
CPC .......... *G02B 27/141* (2013.01); *G02B 27/30* (2013.01); *G03B 33/08* (2013.01); *H04N 9/3111* (2013.01); *H04N 9/3114* (2013.01); *H04N 9/3158* (2013.01)

(56) References Cited

U.S. PATENT DOCUMENTS

| | | | |
|---|---|---|---|
| 2014/0071683 A1* | 3/2014 | Hamada | C09K 11/08 362/259 |
| 2014/0211169 A1 | 7/2014 | Kitano et al. | |
| 2015/0029466 A1* | 1/2015 | Sakata | H01L 33/507 353/31 |
| 2015/0124431 A1* | 5/2015 | Motoya | G02B 26/008 362/84 |
| 2016/0088273 A1 | 3/2016 | Fukui et al. | |

OTHER PUBLICATIONS

"Analysis Report of China's Industrial Patents (vol. No. 32)—New-type Display (Partial English Transtation)," pp. 75-88, attached in Chinese Office Action dated Jun. 9, 2020 for the related Chinese Patent Application No. 201710144143.3.

* cited by examiner

LIGHT SOURCE DEVICE INCLUDING REFLECTIVE FILM REFLECTING AT LEAST PART OF EXCITATION LIGHT, AND PROJECTOR-TYPE IMAGE DISPLAY APPARATUS

RELATED APPLICATION

This application claims the benefit of Japanese Application No. 2016-050335, filed on Mar. 15, 2016, the disclosure of which Application is incorporated by reference herein.

BACKGROUND

1. Technical Field

The present disclosure relates to a light source device and a projector-type image display apparatus.

2. Description of the Related Art

A high-pressure mercury lamp of high brightness has been used as a light source of a projector. Nevertheless this lamp cannot start instantaneously, and has a short service life, so that it has involved troublesome maintenance. On the other hand, solid light sources (e.g. semiconductor laser, LED) have been developed recently, and use of those solid light sources as the light sources of image display apparatus such as a projector is proposed, for instance, in patent literatures 1 and 2.

The light source device disclosed in patent literature 1 includes a blue laser light source (semiconductor laser) serving also as an excitation light source, a phosphor wheel painted with segmented multiple phosphors, and a color wheel for trimming the outgoing fluorescent light from the phosphor wheel into a desirable color light. This light source device rotates the phosphor wheel and the color wheel for outputting color light in a time divisional manner.

The light source device disclosed in patent literature 2 includes a blue laser light source (semiconductor laser) serving also as an excitation light source, a phosphor wheel painted with non-segmented phosphor. This light source device outputs the outgoing fluorescent light from the rotating phosphor wheel and a part of light from the excitation light source together, thereby outputting white light.

CITATION LIST

Patent Literature 1: Unexamined Japanese Patent Application Publication No. 2014-160227

Patent Literature 2: Unexamined Japanese Patent Application Publication No. 2012-98442

SUMMARY

The present disclosure aims to provide a light source device and a projector-type image display apparatus. These devices employ a solid light source for exciting a phosphor, and the light source device as well as the projector-type image display apparatus improves a fluorescent light conversion efficiency of the excitation light for creating highly bright light.

The light source device of the present disclosure comprises the following structural elements:

a solid light source;

a transmissive fluorescent plate painted with a phosphor that is excited by excitation light supplied from the solid light source and emits fluorescent light, the fluorescent plate emitting the fluorescent light from the phosphor along the traveling direction of the excitation light;

a color filter plate that cuts a part of a wavelength region of the light supplied from the fluorescent plate for trimming the outgoing light into a desirable color light; and a first reflective film that reflects at least a part of the excitation light to a light path extending from the fluorescent plate to the color filter plate.

Use of this light source device of the present disclosure allows achieving a highly bright light source device and a projector-type image display apparatus of high brightness.

DETAILED DESCRIPTION

Exemplary embodiments are detailed hereinafter with reference to the accompanying drawings. Nevertheless descriptions more than necessary are sometimes omitted. For instance, well-known matters are not detailed, or duplicative descriptions about substantially the same structures are omitted. Because these omissions will help the descriptions below not be redundant, and aid the skilled persons in the art to understand the present disclosure with ease. The accompanying drawings and the descriptions below are provided for the skilled persons in the art to fully understand the present disclosure, and these materials will not limit the scope of the claims.

In the accompanying drawings, structural elements similar to each other have the same reference marks, and the drawings schematically illustrate the light source device and the projector-type image display apparatus in accordance with the embodiments, so that the ratios between each dimension differ from the actual ones. Actual dimensions should be determined based on the descriptions below. Not to mention, there are differences in relative dimensional relations or ratios between each dimension in some drawings.

In the embodiments below, a projector-type image display apparatus is taken as an example that includes a light source device in accordance with the present disclosure; however, this display device is not limited to a device that employs the light source device of the present disclosure. For instance, the device may be an image display device such as a television receiver, or a lighting apparatus such as a head lamp.

First Exemplary Embodiment

A projector-type image display apparatus in accordance with the first embodiment is demonstrated hereinafter with reference to the accompanying drawings.

Outline of the Projection-type Image Display Apparatus

Figure 1:
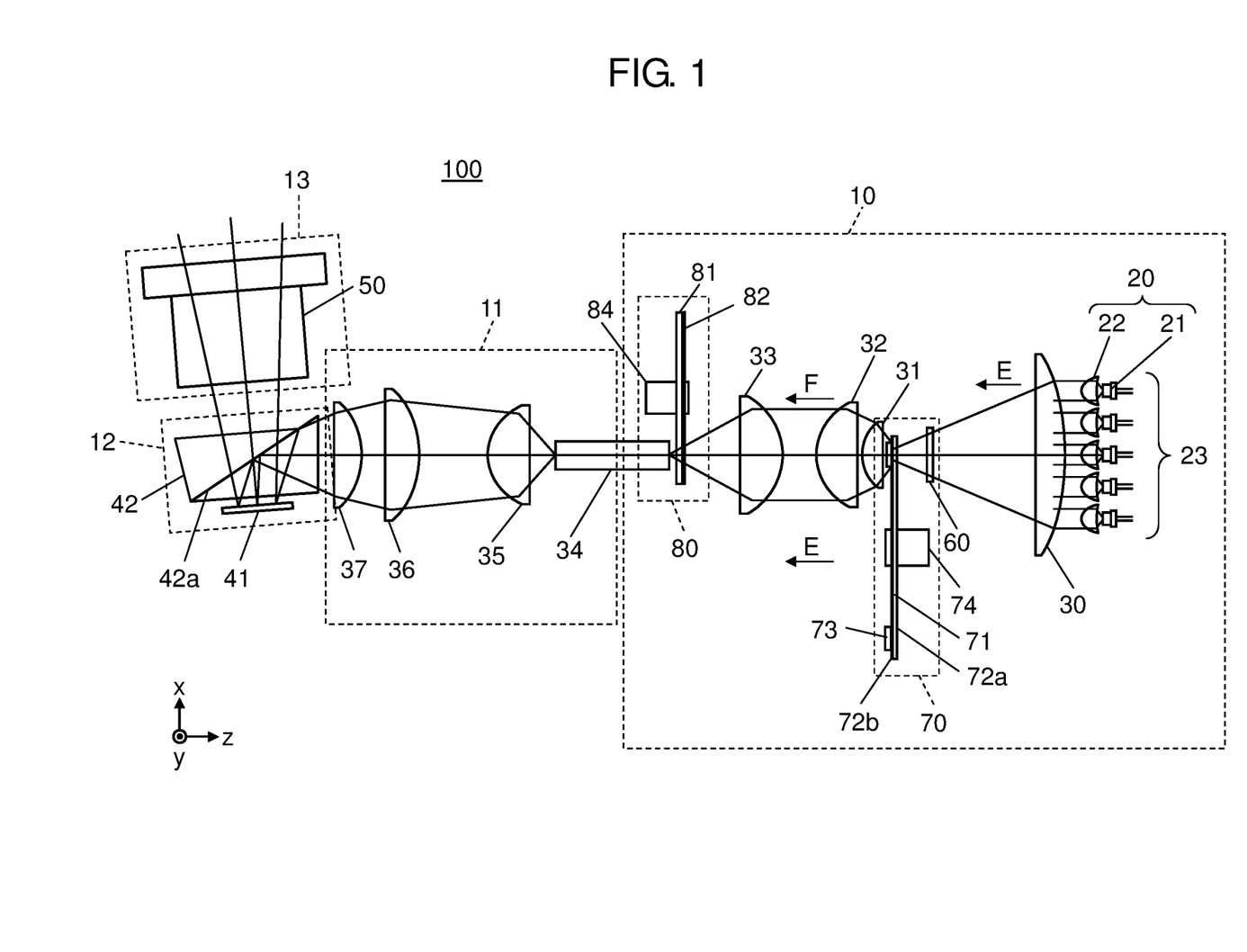
FIG. 1 shows a structure of a projector-type image display apparatus in accordance with a first embodiment of the present disclosure.

FIG. 1 shows a structure of projector-type image display apparatus 100 in accordance with the first embodiment.

Projection-type image display apparatus 100 is formed of light source device 10, lighting device 11, image display section 12, and projection system 13. Light source device 10 emits reference light. Lighting device 11 uniforms the reference light from light source device 10, thereby emitting illumination light. Image display section 12 modulates the illumination light supplied from lighting device 11 with an image signal, and emits the resultant image light. Projection system 13 enlarges the image light supplied from image display section 12 and projects the enlarged image light onto a screen. Projection-type image display apparatus 100 in accordance with the first embodiment is mounted with a single space modulation element 41 (e.g. DMD=Digital Mirror Device) that modulates the illumination light in response to the image signal.

Structure of Light Source Device

Light source device 10 includes light source 20, which is formed of semiconductor laser 21 (i.e. laser light source) and collimator lens 22. Semiconductor laser 21 is an example of the solid light source.

Semiconductor laser 21 emits blue light (e.g. wavelength=455 nm) having the highest luminous efficiency among three primary colors (RGB). Semiconductor laser 21 forms an arrayed light source 23 in which multiple semiconductor lasers 21 are placed in matrix for high-power reference light. Behind the arrayed light source 23, a heat sink (not shown) is disposed for a forced air-cooling. Collimator lens 22 is disposed at the outgoing side of respective semiconductor lasers 21, so that collimator lens 22 parallelizes (=collimates) generally the outgoing light from semiconductor laser 21.

The blue light output from light source 20 is condensed with condenser lens 30 and superimposed on each other and penetrates through diffuser plate 60 and then incident on phosphor wheel 70. Diffuser plate 60 can reduce interference in light from light source 20. Phosphor wheel 70 will be detailed later. The blue light having penetrated through transparent substrate 71 and the fluorescent light emitted from phosphor 73 excited by the blue light can be obtained from phosphor wheel 70.

In other words, the blue light outgoing from light source 20 creates a blue image of image light, and serves as excitation light E that excites phosphor 73 on phosphor wheel 70 for emitting fluorescent light. Phosphor 73 is excited with excitation light E incident from light source 20, thereby emitting fluorescent light F having a wavelength region different from that of excitation light E. A part of excitation light E incident on phosphor 73 is absorbed in phosphor 73 before being converted into heat and fluorescent light F with a given fluorescent light conversion efficiency. Excitation light E incident on phosphor 73 and not absorbed therein penetrates through phosphor 73, and then enters color filter wheel 80 disposed on the latter stage.

Excitation light E and fluorescent light F both outgoing from phosphor wheel 70 are generally collimated with the collimator lens group formed of lens 31 and lens 32, and then condensed with lens 33 before entering color filter wheel 80. Color filter wheel 80 will be detailed later.

A part of excitation light E penetrates, as blue light, through color filter wheel 80, and then enters rod integrator 34. This blue light will create the blue image of the image light. Remaining excitation light E reflects from color filter wheel 80, and travels through lens 33, lens 32, lens 31, and then enters again phosphor wheel 70. Fluorescent light F is trimmed into a desirable color light with color filter wheel 80, and then outgoes from color filter wheel 80 before entering rod integrator 34.

Structure of Phosphor Wheel

Figure 2A:
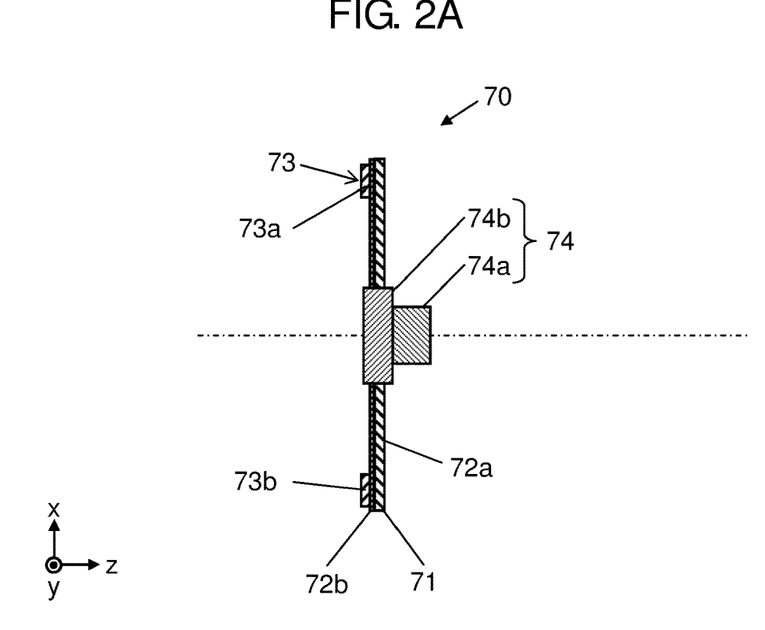
FIG. 2A is a lateral cross sectional view of a phosphor wheel used in the first embodiment.
Figure 2B:
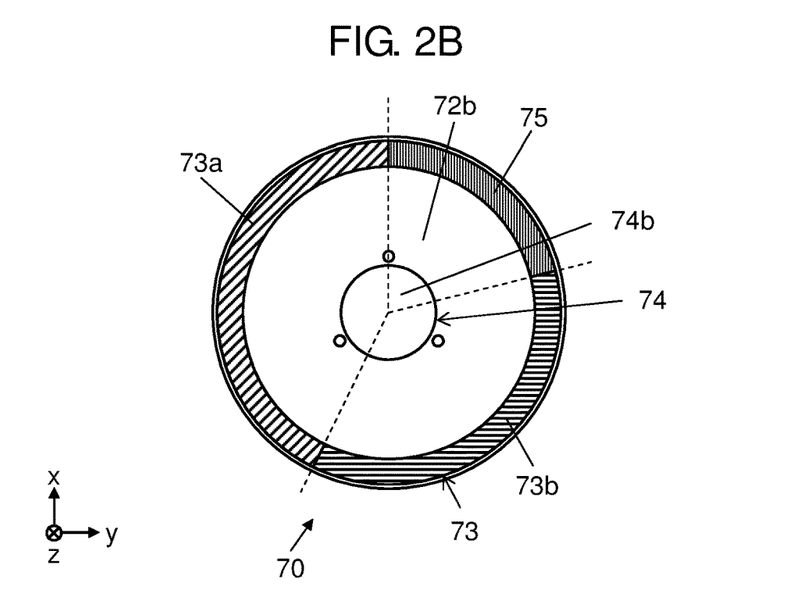
FIG. 2B is a front view of the phosphor wheel used in the first embodiment.

The structure of phosphor wheel 70 is described hereinafter with reference to FIG. 2A and FIG. 2B. FIG. 2A is a lateral cross sectional view of phosphor wheel 70 viewed from direction +y shown in FIG. 1. FIG. 2B is a front view of phosphor wheel 70 viewed from the left side in FIG. 2A (i.e. direction −z shown in FIG. 1).

Phosphor wheel 70, as shown in FIG. 2A, is formed of transparent substrate 71, anti-reflection coating 72a, dichroic coating 72b, phosphor 73 painted onto the same circumferential band of the wheel on which dichroic coating 72b is formed, and motor 74. Motor 74 drives disc-shaped transparent substrate 71. The rotation of phosphor wheel 70 by the motor 74 will disperse the heat to be stored in phosphor 73, thereby cooling phosphor 73.

Transparent substrate 71 is mounted to motor 74 via motor driver 74a and mounting section 74b, and is controlled by a control section (not shown). Mounting section 74b fixedly sandwiches transparent substrate 71 between a hub and a presser member with screws.

Transparent substrate 71 shapes like a disc, and is made of, for instance, a highly heat conductive sapphire substrate. Transparent substrate 71 includes anti-reflection coating 72a on the light incoming surface (i.e. phosphor-free surface), and dichroic coating 72b on the light outgoing surface (i.e. phosphor-formed surface). Dichroic coating 72b transmits the blue light (i.e. excitation light E) and reflects the light having a wavelength region different from that of excitation light E. Dichroic coating 72b is an example of a second reflective film of phosphor wheel 70. As shown in FIG. 2B, phosphor regions 73a, 73b, and transmission region 75 are formed annularly on the surface of dichroic coating 72b of transparent substrate 71 in a concentric manner around the rotary center of transparent substrate 71.

Phosphor region 73a is painted with yellow phosphor Py at a part of the annular shape around the rotary center of transparent substrate 71. Yellow phosphor Py is excited with blue light having a wavelength of approx. 455 nm, thereby emitting yellow light of which dominant wavelength is approx. 570 nm.

Phosphor region 73b is painted with green phosphor Pg at a part of the annular shape around the rotary center of transparent substrate 71. Green phosphor Pg is excited with the blue light having a wavelength of approx. 455 nm, thereby emitting green light of which dominant wavelength is approx. 550 nm.

Within phosphor region 73a, yellow phosphor Py is painted on the surface of dichroic coating 72b of transparent substrate 71 via a transparent binder (not shown). Within phosphor region 73b, green phosphor Pg is painted on the surface of dichroic coating 72b of transparent substrate 71 via a transparent binder.

Yellow phosphor Py employs, for instance, Y3Al5O12: Ce3+. Green phosphor Pg employs, for instance, Lu3Al5O12:Ce3+. The transparent binder employs, for instance, silicone resin.

Transmission region 75 is not painted with phosphor, and excitation light E penetrates through this transmission region 75 without a change in the wavelength. Transparent region 75 is preferably formed of dichroic coating 72b only, or dichroic coating 72b with the transparent binder formed thereon. Anti-reflection coating 72a can be deposited onto transmission region 75 instead of dichroic coating 72b.

The blue light (i.e. excitation light E) enters phosphor wheel 70 from the right side (direction +Z) of FIG. 2A, then penetrates through anti-reflection coating 72a before entering transparent substrate 71. The blue light then penetrates through dichroic coating 72b before entering any one of phosphor regions 73a, 73b, or transmission region 75.

Phosphor wheel 70 rotates such that the foregoing three regions (i.e. phosphor regions 73a, 73b, and transmission region 75) rotate in a unit of one frame (e.g. 1/60 second).

To be more specific, the blue light enters phosphor region 73a (first segment), phosphor region 73b (second segment), and transmission region 75 (third segment) in this order with a time corresponding to the one frame. In other words, an rpm of motor 74 is controlled such that phosphor wheel 70 can rotate a single rotation in a time corresponding to the one frame.

Excitation light E having entered phosphor regions 73a and 73b is partly absorbed in yellow phosphor Py and partly absorbed in green phosphor Pg. The remaining excitation light E is not absorbed but penetrates through the respective phosphor regions. The absorbed excitation light E excites yellow phosphor Py and green phosphor Pg, thereby emitting yellow fluorescent light Fy and green fluorescent light Fg in an isotropic manner. Some components of yellow fluorescent light Fy and green fluorescent light Fg emit in an opposite direction to a traveling direction of excitation light E and then reflect from dichroic coating 72b, and outgo along the traveling direction of excitation light E together with the light component emitted in the traveling direction of excitation light E. Excitation light E having entered transmission region 75 penetrates as it is through transmission region 75.

To be more specific, excitation light E enters the first and the second segments in phosphor wheel 70, and then parts of light E excite yellow phosphor Py and green phosphor Pg, thereby emitting yellow fluorescent light Fy and green fluorescent light Fg. The remaining excitation light E penetrates through yellow phosphor Py and green phosphor Pg. Those fluorescent light Fy, Fg, and excitation light E are generally parallelized with lens 31 and lens 32 as shown in FIG. 1, and then enter color filter wheel 80 through lens 33. Excitation light E having entered the third segment penetrates as it is through phosphor wheel 70, and outgoes therefrom as shown in FIG. 1, and then is parallelized with lens 31 and lens 32 before entering color filter wheel 80 through lens 33.

Transparent substrate 71 is an example of a transmissive fluorescent plate. As discussed above, phosphor 73 formed on transparent substrate 71 is excited with excitation light E, thereby emitting the fluorescent light in the traveling direction of excitation light E.

Structure of Color Filter Wheel

Figure 3A:
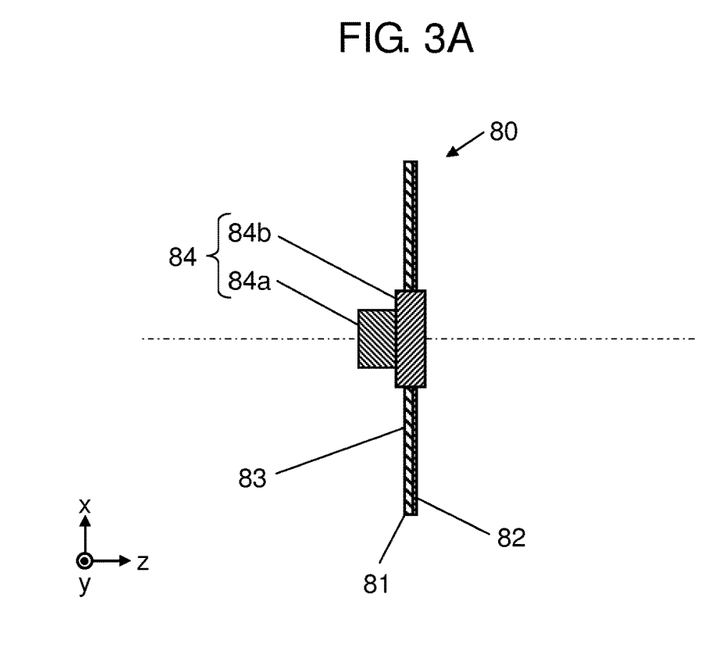
FIG. 3A is a lateral cross sectional view of a color filter wheel used in the first embodiment.
Figure 3B:
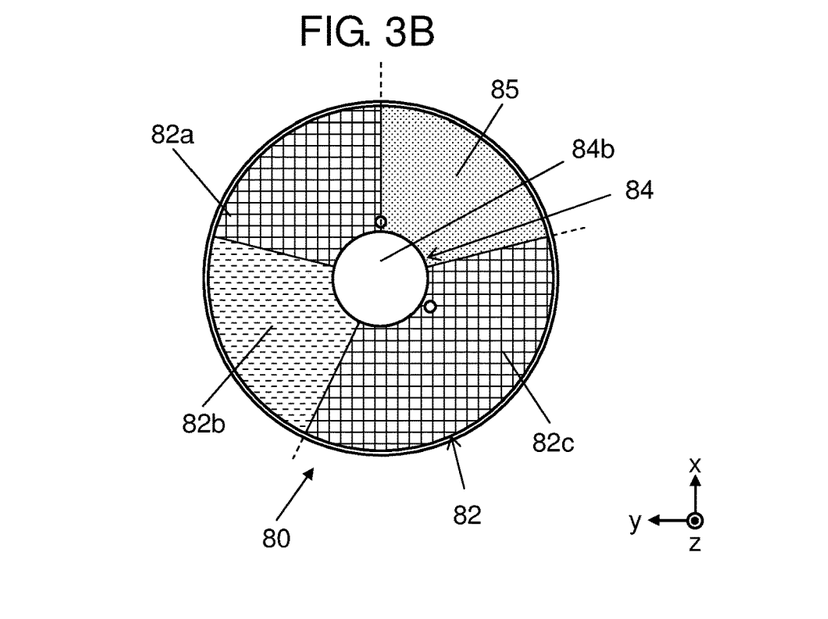
FIG. 3B is a front view of the color-filter wheel used in the first embodiment.

A structure of color filter wheel 80 is described hereinafter with reference to FIG. 3A and FIG. 3B. FIG. 3A is a lateral cross sectional view of color filter wheel 80 viewed from direction +y shown in FIG. 1. FIG. 3B is a front view of color filter wheel 80 viewed from the right side of FIG. 3A (i.e. direction +z shown in FIG. 1).

As FIG. 3A shows, color filter wheel 80 is formed of transparent substrate 81, dichroic coating 82, anti-reflection coating 83, and motor 84. Motor 84 drives disc-shaped transparent substrate 81. Transparent substrate 81 is mounted to motor 84 via motor driver 84a and mounting section 84b, and is controlled by a control section (not shown). Mounting section 84b fixedly sandwiches transparent substrate 81 between a hub and a presser member with screws.

Transparent substrate 81 shapes like a disc, and is formed of glass substrate with high transmission over the entire visible region.

Transparent substrate 81 is coated with dichroic coating 82 at the light incoming surface. This dichroic coating 82 reflects and cuts a part the wavelength region of the incident light for transmitting only the light having a desirable wavelength region, whereby desirable color light is obtained. Dichroic coating 82 includes color filters 82a, 82b, and 82c. Transparent substrate 81 is also coated with anti-reflection film 83 at the light outgoing surface. Dichroic coating 82 is an example of a first reflective film of the color filter.

Figure 8:
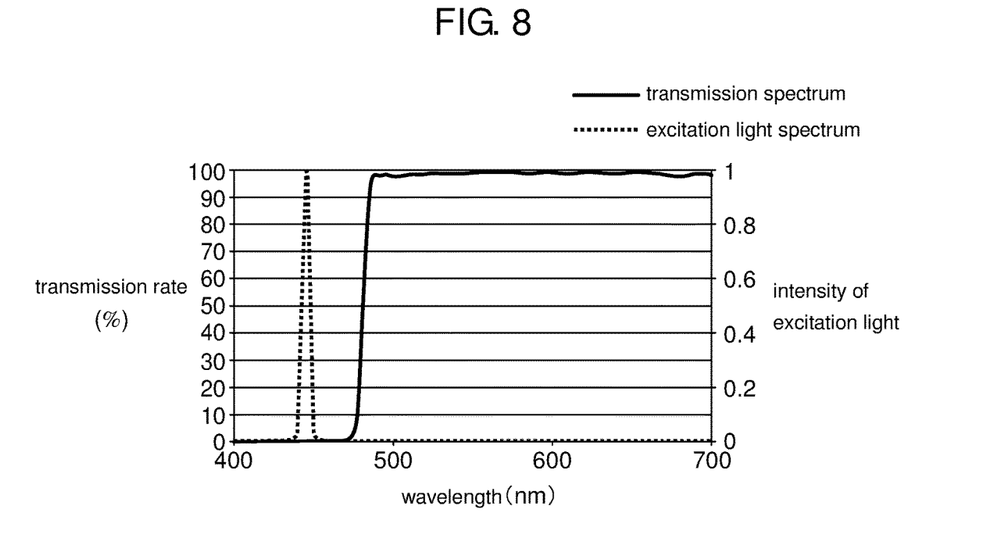
FIG. 8 shows a spectrum of a color filter used in the first embodiment.

As FIG. 3B shows, color filter wheel 80 includes four segments, namely, color filter 82a (first segment), color filter 82b (second segment), color filter 82c (third segment), and light diffuser region 85 (fourth segment). Color filters 82a and 82c are made of color filter (dichroic coating) that highly transmits the visible light having a wavelength region longer than 480 nm, and yet, highly reflects the visible light having a wavelength region equal to or shorter than 480 nm. Color filters 82a and 82c thus highly reflect the excitation light having a wavelength of approx. 455 nm as shown in FIG. 8. Color filters 82a and 82c can also highly transmit the light having a wavelength region longer than 480 nm, and highly reflect the light having a wavelength region equal to or shorter than 480 nm.

Figure 9:
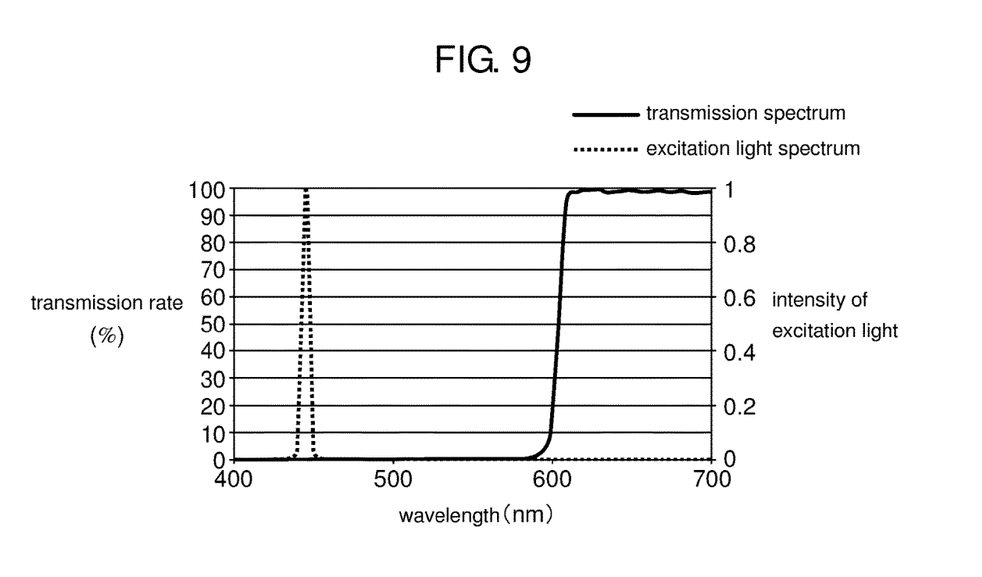
FIG. 9 shows a spectrum of another color filter used in the first embodiment.

Color filter 82b is made of color filter (dichroic coating) that highly transmits the visible light having a wavelength region longer than 600 nm, and yet, highly reflects the visible light having a wavelength region equal to or shorter than 600 nm. Color filter 82b thus also highly reflects the excitation light having a wavelength of approx. 455 nm as shown in FIG. 9. This color filter 82b can also highly transmit the light having a wavelength region longer than 600 nm, and highly reflect the light having a wavelength region equal to or shorter than 600 nm.

In other words, color filters 82a, 82b, and 82c perform trimming, namely, reflecting and cutting parts of wavelength regions of the incident light, for transmitting only the light having the desirable wavelength regions in order to obtain desirable color light.

Light diffuser region 85 (fourth segment) has a light diffusion function of diffusing the incident light. For instance, transparent substrate 81 forms a diffuser plate having numerous micro lens arrays on the surface. The respective segments form fan shapes (sectors) around the rotation center of transparent substrate 81. Color filter wheel 80 forms an integrated structure in which multiple kinds of color filters and diffusion surfaces are formed together locally on one sheet of transparent substrate 81, or sectorshaped respective color filters and diffuser plates are laid out and fixed onto transparent substrate 81.

Phosphor wheel 70 and color filter wheel 80 are controlled such that they rotate synchronously with each other at the same rpm. To be more specific, the rotation of color filter wheel 80 is controlled such that the foregoing four segments rotate one single rotation in a time corresponding to one frame (e.g. 1/60 second).

Color filters 82a, 82b, and 82c are one example of the color filter plate that cuts a part of the wavelength region of the light supplied from phosphor wheel 70, thereby trimming the light into a desirable color light.

Timing between Phosphor wheel and Color Filter Wheel

The rotations of the respective wheels are controlled and adjusted such that yellow fluorescent light Fy emitted from phosphor region 73a of phosphor wheel 70 can enter color filters 82a and 82b of color filter wheel 80. A center angle of phosphor region 73a is thus set to be equal to the sum of a center angle of color filter 82a and a center angle of color filter 82b.

Color filter 82a reflects visible light, of which wavelength is equal to or shorter than 480 nm, of yellow fluorescent light Fy outgoing from phosphor region 73a, and yet, transmits visible light of which wavelength is longer than 480 nm, thereby creating yellow reference light Ly. Color filter 82b reflects visible light, of which wavelength is equal to or shorter than 600 nm, of yellow fluorescent light Fy outgoing from phosphor region 73a, and yet, transmits visible light of which wavelength is longer than 600 nm, thereby creating red reference light Lr.

The rotations of the respective wheels are controlled and adjusted such that green fluorescent light Fg emitted from phosphor region 73b of phosphor wheel 70 can enter color filters 82c of color filter wheel 80. A center angle of phosphor region 73b is thus set to be equal to a center angle of color filter 82c.

Color filter 82c reflects visible light, of which wavelength is equal to or shorter than 480 nm, of green fluorescent light Fg outgoing from phosphor region 73b, and yet, transmits visible light of which wavelength is longer than 480 nm, thereby creating green reference light Lg.

In the foregoing discussion, color filters 82a, 82b, and 82c are demonstrated such that they transmit or reflect visible light; however, they can reflect ultraviolet light and transmit infrared light.

The rotations of the respective wheels are controlled and adjusted such that excitation light E penetrating through transmission region 75 of phosphor wheel 70 can enter light diffuser region 85 of color filter wheel 80. A center angle of transmission region 75 is thus set to be equal to a center angle of light diffuser region 85. Excitation light E having penetrated through light diffuser region 85 diffuses in light diffuser region 85, thereby creating blue reference light Lb.

Structure of Lighting Device

As FIG. 1 shows, lighting device 11 includes rod integrator 34, lens 35, lens 36, and lens 37. The outgoing reference light from rod integrator 34 travels through lenses 35, 36, and 37, and then outgoes as illumination light from lighting device 11 before entering image display section 12.

Structures of Image Display Section and Projection System

Image display section 12 receives the illumination light outgoing from lighting device 11, thereby creating an image, and as FIG. 1 shows, image display section 12 includes total reflection prism 42 and a sheet of DMD 41 (i.e. space modulation element).

Total reflection prism 42 has surface 42a that reflects light totally, and guides the incoming illumination light from lighting device 11 to DMD 41, which includes multiple movable micro-mirrors. These micro-mirrors are controlled by a controller (not shown) such that they be in accordance with timings of the respective reference light (illumination light) entering the respective micro-mirrors and yet they be in response to the image signal supplied, whereby the respective reference light are modulated with the image signal. The light modulated in DMD 41 penetrates through total reflection prism 42, and then enters projection lens 50, which is an example of a projection optical system.

Projection system 13 includes projection lens 50 and a screen (not shown). Projection lens 50 projects image light temporally synthesized onto the screen.

Description of Fluorescent Light Conversion Light Path

Figure 4:
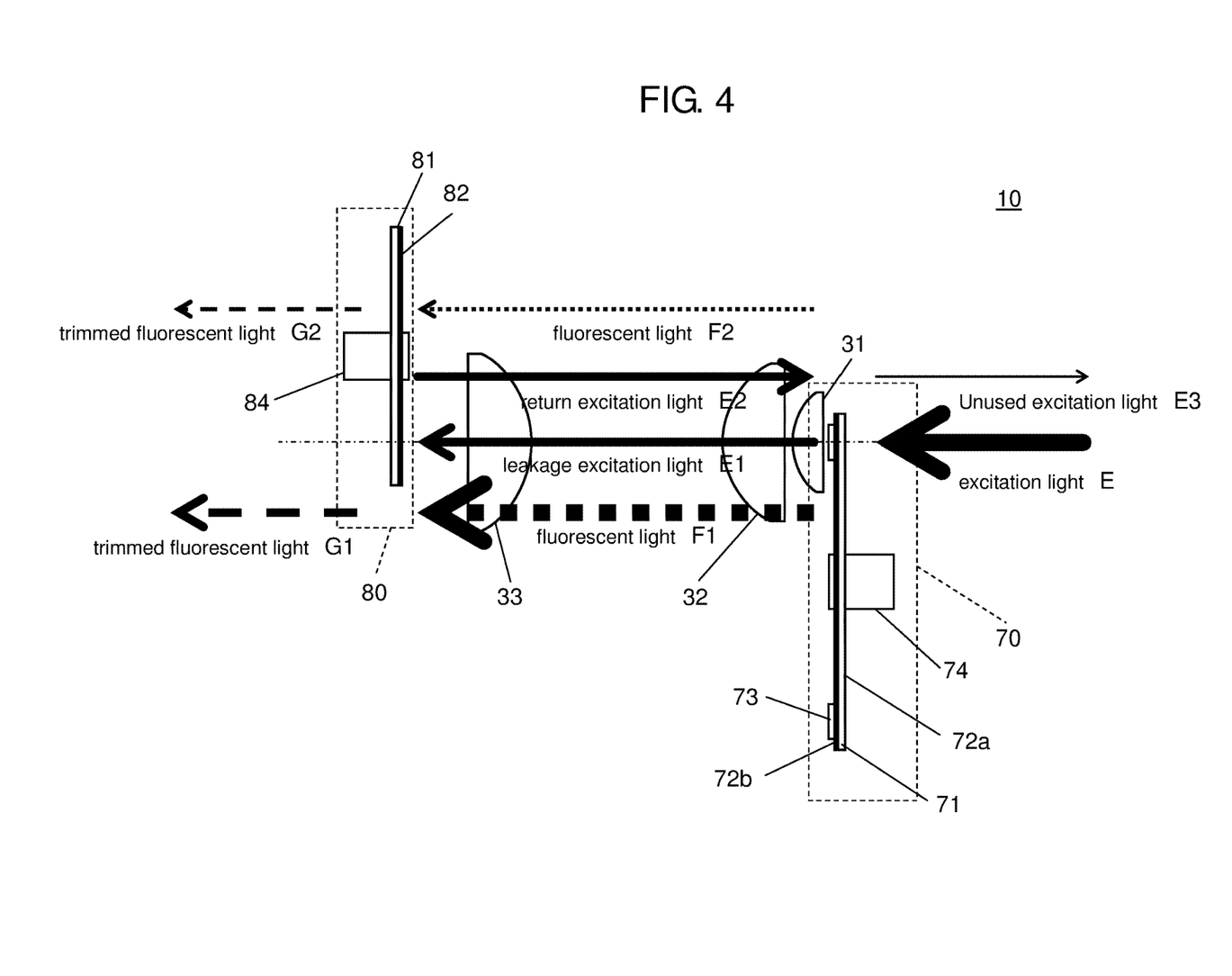
FIG. 4 schematically illustrates a fluorescent light conversion light path used in the first embodiment.

The fluorescent light conversion light path in accordance with the present disclosure is demonstrated hereinafter with reference to FIG. 4, which omits light source 20 from light source device 10 shown in FIG. 1 and illustrates an enlarged fluorescent light conversion section that is formed of phosphor wheel 70 and color filter wheel 80.

Excitation light E outgoing from light source 20 (=excitation light source) penetrates through anti-reflection coating 72a, transparent substrate 71, and dichroic coating 72b of phosphor wheel 70, before entering phosphor 73. A part of excitation light E is absorbed in phosphor 73, and converted into heat and fluorescent light F1 with a given fluorescent light conversion efficiency. Fluorescent light F1 outgoes from phosphor 73. Remaining excitation light E, which is not absorbed by phosphor 73, penetrates through phosphor 73 as leakage excitation light E1.

Fluorescent light F1 outgoing from phosphor 73 and leakage excitation light E1 penetrating through phosphor 73 travel through lenses 31, 32, and 33 before entering color filter wheel 80.

Fluorescent light F1 having entered color filter wheel 80 partially penetrates (i.e. a part of wavelength region of fluorescent light F1) through dichroic coating 82, and the light of remaining wavelength region outgoes as 'reflected and trimmed' fluorescent light G1 from color filter wheel 80.

Leakage excitation light E1 having entered color filter wheel 80 reflects from dichroic coating 82 and turns to return excitation light E2, then travels through lenses 33, 32, and 31 before entering again phosphor 73 of phosphor wheel 70.

A part of return excitation light E2 having entered again phosphor 73 is absorbed in phosphor 73, and converted into heat and fluorescent light F2 with the given fluorescent light conversion efficiency, and this fluorescent light F2 outgoes from phosphor 73. Remaining return excitation light E2 (not absorbed by phosphor 73) penetrates as unused excitation light E3 through phosphor 73, and outgoes from phosphor wheel 70.

Fluorescent light F2 outgoing from phosphor 73 travels through lenses 31, 32, and 33 before entering color filter wheel 80. The light of a part of wavelength region of this fluorescent light F2 then penetrates through dichroic coating 82, and the remaining light of the other wavelength region outgoes as 'reflected and trimmed' fluorescent light G2 from color filter wheel 80.

The optical system, which makes the outgoing light from phosphor wheel 70 enter the color filter wheel 80, is formed of lenses 31, 32, and 33. This optical system conjugates with respect to both of the outgoing surface of phosphor wheel 70 and the incident surface of color filter wheel 80. To be more specific, it conjugates between the phosphor-formed surface of transparent substrate 71 and the dichroic-coating-formed surface of color filter wheel 80. Leakage excitation light E1 that outgoes from phosphor wheel 70 and enters color filter wheel 80 thus travels through approx. the same light path as return excitation light E2 that reflects from color filter wheel 80 and enters again phosphor wheel 70 travels.

Yellow phosphor Py painted on phosphor region 73a in this embodiment is excited with incident excitation light E, thereby emitting yellow fluorescent light Fy as fluorescent light F1. The penetration of yellow fluorescent light Fy through color filter 82a allows creating yellow reference light Ly as trimmed fluorescent light G1, and the penetration of yellow fluorescent light Fy through color filter 82b allows creating red reference light Lr as trimmed fluorescent light G1.

Green phosphor Pg painted on phosphor region 73b is excited with incident excitation light E, thereby emitting green fluorescent light Fg as fluorescent light F1. The penetration of green fluorescent light Fg through color filter 82c allows creating green reference light Lg as trimmed fluorescent light G1.

Excitation light E incident on transparent region 75 penetrates through this region 75 as it is, and when it penetrates through light diffusion region 85, it is diffused, thereby creating blue reference light Lb.

Leakage excitation light E1 not absorbed in phosphor region 73a reflects from color filters 82a and 82b, and then turns into return excitation light E2 before entering phosphor region 73a again. A non-absorbed component of return excitation light E2 having entered phosphor region 73a penetrates as unused excitation light E3 through phosphor region 73a, and a component, absorbed in phosphor region 73a, of return excitation light E2 excites yellow phosphor Py. The excited yellow phosphor Py emits yellow fluorescent light Fy as fluorescent light F2 with a given fluorescent light conversion efficiency. The penetration of yellow fluorescent light Fy through color filter 82a allows creating yellow reference light Ly as trimmed fluorescent light G2. The penetration of yellow fluorescent light Fy through color filter 82b allows creating red reference light Lr as trimmed fluorescent light G2.

Leakage excitation light E1 not absorbed in phosphor region 73b reflects from color filter 82c, and turns into return excitation light E2, and then enters phosphor region 73b again. A component, not absorbed in phosphor region 73b, of return excitation light E2 penetrates as unused excitation light E3 through phosphor region 73b. A component, absorbed in phosphor region 73b of return excitation light E2, excites green phosphor Pg, which then emits green fluorescent light Fg as fluorescent light F2 with a given fluorescent light conversion efficiency. The penetration of green fluorescent light Fg emitted from phosphor region 73b through color filter 82c allows creating green reference light Lg as trimmed fluorescent light G2.

The phosphor layer, in which phosphor 73 is dispersed, of phosphor wheel 70 has a film thickness and a particle density adjusted so as to transmit incident excitation light E at a given ratio. To be more specific, a thinner film thickness of the phosphor layer and a lower density of phosphor particles will increase an amount of leakage excitation light E1. This leakage excitation light E1 can enter phosphor 73 again as return excitation light E2, thereby exciting phosphor 73. This mechanism allows the thinner phosphor layer and the lower density of the phosphor particles of phosphor 73 to produce a given amount of fluorescent light.

Advantageous Effect

The light source device that uses a solid light source (e.g. semiconductor laser) for exciting a phosphor needs a high fluorescent light conversion efficiency in converting the excitation light into the fluorescent light. The fluorescent plate emits fluorescent light in an isotropic manner through this mechanism: the outgoing excitation light from the solid light source enters, via the optical system, the phosphor layer formed on the fluorescent plate, then the phosphor (e.g. phosphor crystal, phosphor particle) dispersed in the phosphor layer absorbs the excitation light, whereby the phosphor is excited for emitting the fluorescent light in an isotropic manner. To heighten the fluorescent light conversion efficiency, the density of phosphor particles in the phosphor layer should be increased, or the thickness of the phosphor layer should be increased for the phosphor to absorb a greater amount of the excitation light. These methods have been proposed.

Nevertheless the higher density of the phosphor in the phosphor layer indeed allows the phosphor to absorb the greater amount of excitation light; however, the fluorescent light generated is also absorbed at a higher rate in the phosphor layer, and yet, emission of the fluorescent light involves an increment of an amount of heat.

The greater thickness of the phosphor layer causes the heat generated during the emission of the fluorescent light to be stuffy in the phosphor layer, so that a temperature of the phosphor layer increases. In general, phosphor 73 used in this first embodiment lowers its luminous efficiency at a higher environmental temperature. The foregoing methods have encountered these problems discussed above, so that it is difficult for these methods to improve the fluorescent light conversion efficiency or heighten the brightness of the light source device.

In the first embodiment, dichroic coating 82 is provided to color filter wheel 80 for reflecting excitation light E, and the optical system conjugates between phosphor wheel 70 and color filter wheel 80. This structure allows dichroic coating 82 formed on color filter wheel 80 to reflect excitation light E which has penetrated through phosphor wheel 70 but is not yet converted, and to guide this reflected excitation light E to phosphor wheel 70 again. This structure does not need increasing the density of phosphor particles in the phosphor layer or does not need increasing the thickness of the phosphor layer, and yet, this structure allows improving the fluorescent light conversion efficiency of the excitation light and also heightening the brightness of the light source.

The foregoing structure allows reducing the thickness of the phosphor layer necessary for absorbing the excitation light, so that the heat dissipation performance of the phosphor layer can be improved. As a result, the temperature of phosphor 73 can be lowered, and the luminous efficiency of phosphor 73 can be improved, which heightens the brightness of the light source device.

Second Exemplary Embodiment

Figure 5:
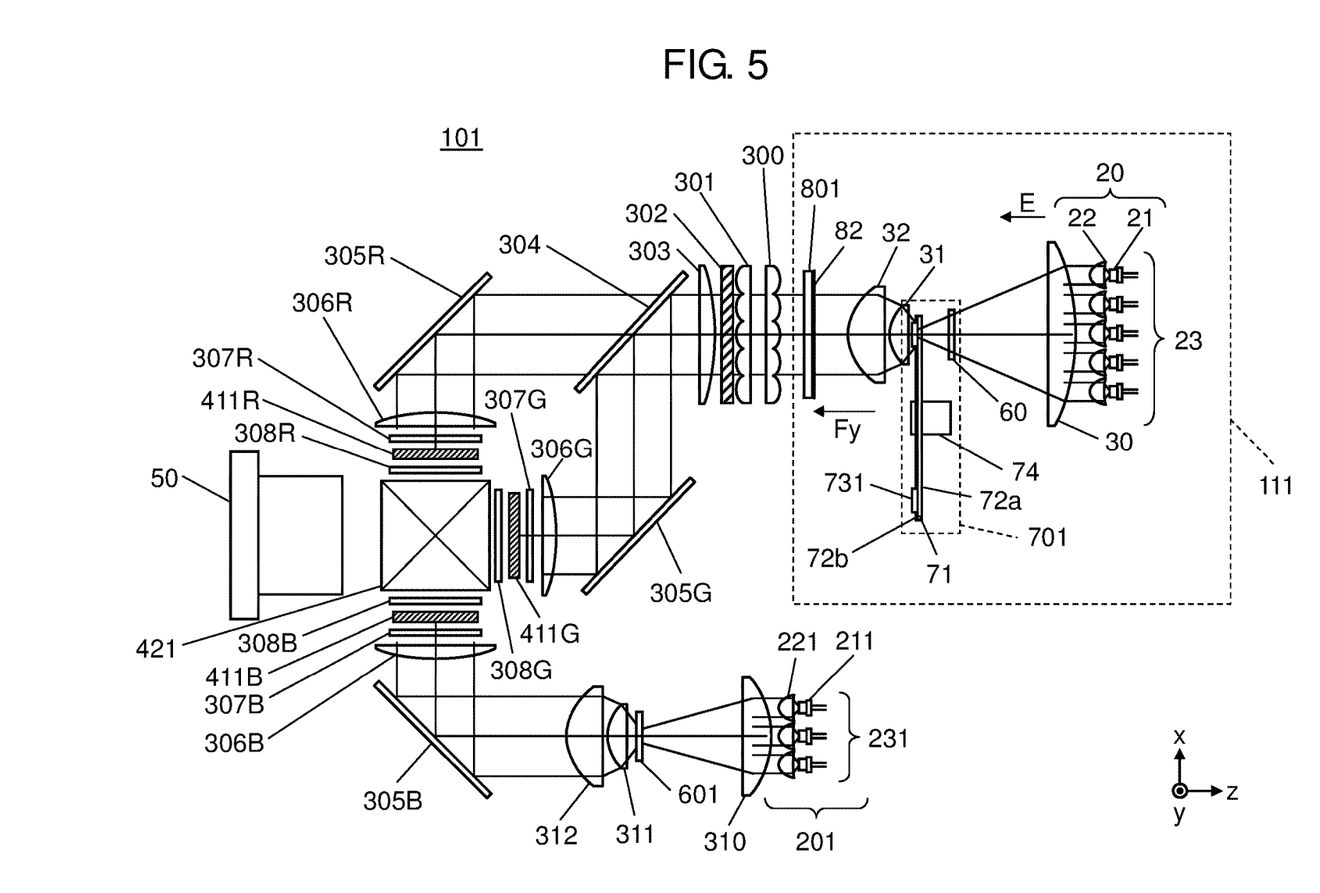
FIG. 5 shows a structure of a projector-type image display apparatus in accordance with a second embodiment of the present disclosure.

FIG. 5 shows a structure of projector-type image display apparatus 101 in accordance with the second embodiment. In the following description, structural elements similar to those in FIG. 1 have the same reference marks, and different points from the first embodiment are chiefly described.

In the first embodiment previously discussed, one sheet of DMD 41 is used as a space conversion element, and an image corresponding to reference image light created in a time divisional manner by light source device 10 is projected in a time divisional manner onto a screen, thereby displaying the image. In this second embodiment of the present disclosure, three-plate type LCD projector that employs three sheets of space conversion elements, namely, LCD411R, LCD411G, and LCD411B, is demonstrated.

Structure of Light Source Device

Projection-type image display apparatus 101 of theh present disclosure comprises the following structural elements:
light source device 111 for emitting yellow fluorescent light Fy that creates green reference light Lg and red reference light Lr; and
light source 201 for creating blue reference light Lb.

Light source device 111 includes light source 20, condenser lens 30, diffuser plate 60, phosphor wheel 701, lens 31, lens 32, and color filter 801. Light source 20 emits excitation light E. Condenser lens 30 condenses the light from light source 20 onto phosphor wheel 701. Diffuser plate 60 reduces interference in the light supplied from light source 20. Phosphor wheel 701 emits fluorescent light F with the aid of excitation light E. Lenses 31 and 32 generally collimate fluorescent light F outgoing from phosphor wheel 701. Color filter 801 reflects excitation light E not absorbed in phosphor wheel 701.

Light source 201 forms an arrayed light-source 231 in which semiconductor laser light source 211 for emitting blue reference light Lb (e.g. wavelength 455 nm) and collimator lens 221 for collimating the light from semiconductor laser light source 211 are arrayed in matrix.

Overall Structure

Outgoing yellow fluorescent light Fy from light source device 111 travels through lens array 300, lens array 301, polarization conversion element 302, and condenser lens 303, thereby illuminating uniformly green LCD 411G and red LCD 411R. Outgoing yellow fluorescent light Fy from condenser lens 303 is separated into green reference light Lg and red reference light Lr with dichroic mirror 304. Green reference light Lg reflects from mirror 305G, then penetrates through lens 306G and polarizing plate 307G formed on the incident side, and then is modulated into image light with green LCD 411G. This image light is guided to color synthesizer prism 421 through polarizing plate 308G on the outgoing side. Red reference light Lr reflects from mirror 305R, then penetrates through lens 306R and polarizing plate 307R formed on the incident side, and then is modulated into image light with red LCD 411R. This image light is guided to color synthesizer prism 421 through polarizing plate 308R on the outgoing side.

Blue reference light Lb outgoing from light source 201 is condensed onto diffuser plate 601 with condenser lens 310. Blue reference light Lb diffused through diffuser plate 601 is generally collimated with lenses 311 and 312, and travels through mirror 305B, lens 306B, and polarizing plate 307B on the incident side, and then illuminates blue LCD 411B, where the blue reference light Lb is modulated into image light and guided to color synthesizer prism 421 through polarizing plate 308B disposed on the outgoing side.

Blue reference light Lb, green reference light Lg, and red reference light Lr modulated to the image light are synthesized with color synthesizer prism 421, and enlarged and projected onto a screen (not shown) through projection lens 50.

Figure 6A:
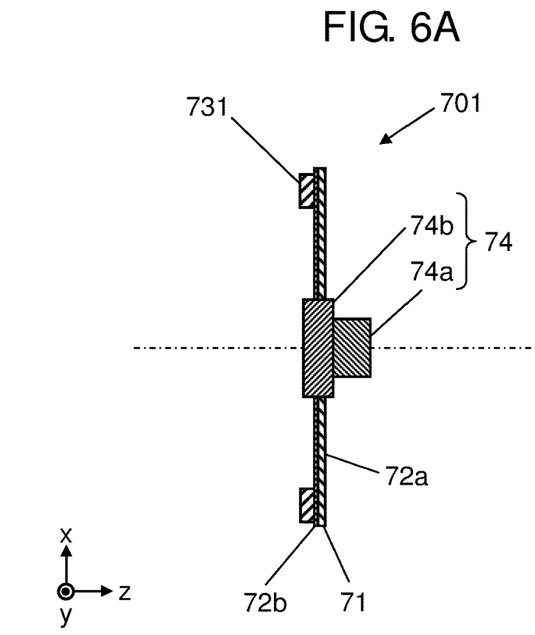
FIG. 6A is a lateral cross sectional view of a phosphor wheel used in the second embodiment.
Figure 6B:
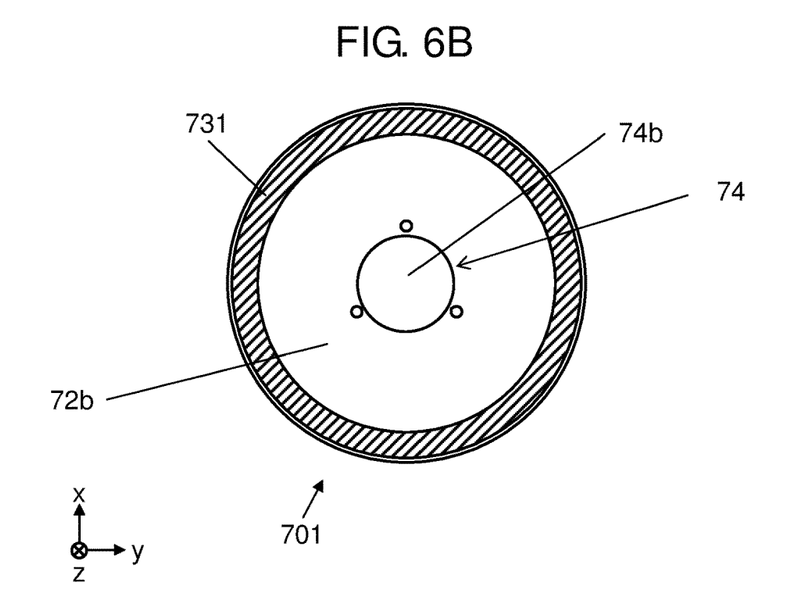
FIG. 6B is a front view of the phosphor wheel used in the second embodiment.

Structure of Phosphor Wheel and Description of Fluorescent Light Conversion Path FIG. 6A and FIG. 6B illustrate a structure of phosphor wheel 701. FIG. 6A is a lateral cross sectional view of phosphor wheel 701 viewed from direction +y in FIG. 5, and FIG. 6B is a front view of phosphor wheel 701 viewed from the left side (i.e. direction −Z shown in FIG. 5) of FIG. 5

Phosphor wheel 701 differs from phosphor wheel 70 in the structure, namely, phosphor wheel 701 is formed of transparent substrate 71 and one kind of phosphor 731 annularly formed on transparent substrate 71. Phosphor 731 is made of yellow phosphor Py that emits yellow fluorescent light Fy, which contains green reference light Lg and red reference light Lr. Yellow phosphor Py is excited by excitation light E supplied from light source 20, thereby emitting yellow fluorescent light Fy. Phosphor wheel 701 is rotated by motor 74, thereby dispersing heat to be stored in phosphor 731 for cooling phosphor 731.

Color filter 801 is a dichroic filter that reflects blue light (excitation light E) and transmits the light of the other wavelength region. Color filter 801 can employ the dichroic filter having the spectral characteristics shown in FIG. 8.

The fluorescent light conversion light path in accordance with this second embodiment is demonstrated hereinafter by replacing phosphor wheel 70 shown in FIG. 4 with phosphor wheel 701 in accordance with the second embodiment, and replacing color filter wheel 80 and lens 33 with color filter 801 in accordance with the second embodiment.

Outgoing fluorescent light F1 from phosphor wheel 701 and leakage excitation light E1 not absorbed in phosphor 731 are generally collimated with lenses 31 and 32, and then enter approx. vertically the color filter 801. Fluorescent light F1 having entered color filter 801 penetrates through color filter 801, and outgoes from color filter 801 as trimmed fluorescent light G1. Leakage excitation light E1 having entered color filter 801 reflects from color filter 801 and turns into return excitation light E2, which then travels through the same path and enters again phosphor 731 of phosphor wheel 701.

A part of return excitation light E2 having entered again phosphor 731 is absorbed in phosphor 731, and converted into heat and fluorescent light F2 with a given fluorescent light conversion efficiency. Fluorescent light F2 outgoes from phosphor wheel 701 toward color filter 801. Return excitation light E2 having entered phosphor 731 but not absorbed in phosphor 731 penetrates through phosphor 731 and phosphor wheel 701 as unused excitation light E3. Outgoing fluorescent light F2 from phosphor wheel 701 is generally collimated with lenses 31 and 32, and then enters approx. vertically the color filter 801, and outgoes therefrom as trimmed fluorescent light G2.

Advantageous Effect

In this second embodiment, outgoing light from phosphor wheel 701 enters approx. vertically the color filter 801. This structure allows color filter 801 to reflect not-yet converted excitation light E having penetrated through phosphor wheel 701, and to guide this excitation light E to phosphor wheel 701 again. This mechanism improves the fluorescent light conversion efficiency of excitation light E, and heightens the brightness of the light source device.

The film thickness of the phosphor layer necessary for absorbing the excitation light can be reduced, so that the heat dissipation performance of the phosphor layer can be improved. As a result, the temperature of phosphor 731 lowers, thereby improving the luminous efficiency thereof, and the brightness of the light source device can be increased.

Third Exemplary Embodiment

Figure 7:
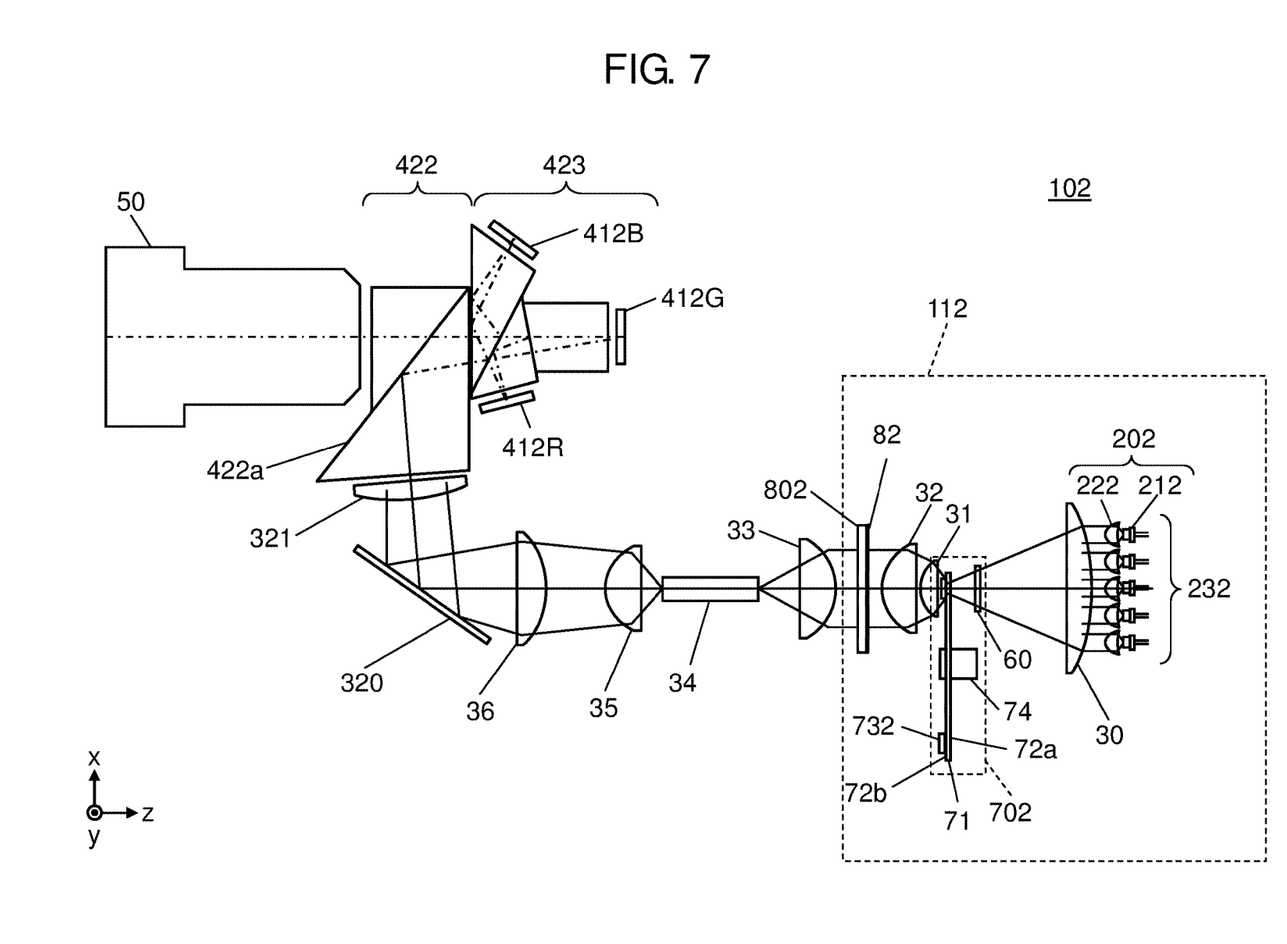
FIG. 7 shows a structure of a projector-type image display apparatus in accordance with a third embodiment of the present disclosure.

FIG. 7 shows a structure of projector-type image display apparatus 102 in accordance with the third embodiment of the present disclosure. In the description below, structural elements similar to those in FIG. 1 have the same reference marks, and different points from the first embodiment are chiefly described hereinafter.

In the first embodiment previously described, one sheet of DMD 41 is used as a space conversion element, and an image corresponding to reference image light created in a time divisional manner by light source device 10 is projected in a time divisional manner onto a screen, thereby displaying the image. In this third embodiment of the present disclosure, three sheets of space conversion elements, namely, DMD412R, DMD412G, and DMD412B, are employed.

Structure of Light Source Device

Projection-type image display apparatus 102 in accordance with the present disclosure includes light source device 112 that emits white reference light Lw.

Light source device 112 comprises the following structural element:

light source 202 for emitting excitation light E;

condenser lens 30 for condensing the outgoing light from light source 202 onto phosphor wheel 702;

diffuser plate 60 for reducing interference in the outgoing light supplied from light source 202;

phosphor wheel 702 excited by excitation light E, thereby emitting fluorescent light F;

lenses 31, 32 for collimating the outgoing light from phosphor wheel 702; and color filter 802 for reflecting excitation light E not absorbed in phosphor wheel 702.

Light source 202 forms an arrayed light-source 232 in which semiconductor laser 212 and collimator lens 222 are arrayed in matrix. Semiconductor laser 212 emits ultraviolet light (e.g. wavelength 410 nm) as excitation light E, and collimator lens 222 collimates the outgoing light from semiconductor laser 212.

Overall Structure

Outgoing white reference light Lw from light source device 112 travels through lens 33, rot-integrator 34, lens 35, lens 36, mirror 320, and lens 321 before entering total reflection prism 422. White reference light Lw reflects from reflection surface 422a of prism 422, and is separated by color prism 423 before entering blue DMD 412B, green DMD 412G, and red DMD 412R. The resultant white reference light Lw is modulated into respective image light, and then synthesized by color prism 423 again before penetrating through total reflection prism 422. This white reference light Lw is finally magnified and projected onto the screen (not shown).

Structure of Phosphor Wheel and Description of Fluorescent Light Conversion Light Path Phosphor wheel 702 is formed of transparent substrate 71 and one kind of phosphor 732 annularly formed on transparent substrate 71. This structure is similar to that of phosphor wheel 701 in accordance with the second embodiment shown in FIGS. 6A and 6B. Phosphor 732 is white phosphor Pw that emits white reference color Lw, and is made by mixing blue phosphor Pb and yellow phosphor Py together. Blue phosphor Pb is excited by excitation light E for emitting blue fluorescent light Fb, and yellow phosphor Py is excited by excitation light E for emitting yellow fluorescent light Fy. Phosphor 732 is excited by excitation light E incoming from light source 202 for emitting blue fluorescent light Fb and yellow fluorescent light Fy, thereby creating white reference light Lw. Phosphor wheel 702 is rotated by motor 74 for dispersing the heat to be stored in phosphor 732, thereby cooling phosphor 732.

Color filter 802 is a dichroic filter that reflects ultraviolet light (i.e. excitation light E) while it transmits the light in the other wavelength region.

The fluorescent light conversion light path in accordance with this third embodiment is demonstrated hereinafter by replacing phosphor wheel 70 shown in FIG. 4 with phosphor wheel 702 in accordance with the third embodiment, and replacing color filter wheel 80 and lens 33 with color filter 802 in accordance with the third embodiment.

Outgoing fluorescent light F1 from phosphor wheel 702 and leakage excitation light E1 not absorbed in phosphor 732 are generally collimated with lenses 31 and 32, and then enter approx. vertically the color filter 802. Fluorescent light F1 having entered color filter 802 penetrates through color filter 802, and then outgoes from color filter 802 as trimmed fluorescent light G1. Leakage excitation light E1 having entered color filter 802 reflects from color filter 802 and turns into return excitation light E2, which then travels through the same path and enters again phosphor 732 of phosphor wheel 702.

A part of return excitation light E2 having entered phosphor 732 again is absorbed in phosphor 732, and converted into fluorescent light F2 and heat with a given fluorescent light conversion efficiency. Fluorescent light F2 outgoes from phosphor wheel 702 toward color filter 802. Return excitation light E2 having entered phosphor 732 but not absorbed in phosphor 732 penetrates through phosphor 732 and phosphor wheel 702 as unused excitation light E3. Fluorescent light F2 outgoing from phosphor wheel 702 is generally collimated with lenses 31 and 32, and then enters approx. vertically the color filter 802, and outgoes therefrom as trimmed fluorescent light G2.

Advantageous Effect

In this third embodiment, outgoing light from phosphor wheel 702 enters approx. vertically the color filter 802. This structure allows color filter 802 to reflect not-yet converted excitation light E having penetrated through phosphor wheel 702, and to guide this light E to phosphor wheel 702 again. This mechanism improves the fluorescent light conversion efficiency of excitation light E, and heightens the brightness of the light source device.

The film thickness of the phosphor layer necessary for absorbing the excitation light can be reduced, so that the heat dissipation performance of the phosphor layer can be improved. As a result, the temperature of phosphor 732 lowers, thereby improving the luminous efficiency thereof, and the brightness of the light source device can be increased.

The color filters used in the embodiments discussed previously are structured such that they highly reflect the excitation light; however, as far as they can reflect at least a part of the excitation light incident on them, they achieve the advantages discussed previously.

Each of the color filter plates used in the foregoing embodiments includes a first reflective film that highly reflects the excitation light. The placement position of the first reflective film is not limited to the places discussed in the embodiments. Nevertheless as far as it is placed on the light path extending from the fluorescent plate to the color filter plate, the advantages discussed previously can be obtained.

INDUSTRIAL APPLICABILITY

The present disclosure relates to the light source device that employs a phosphor exciting light source, and is applicable to a projector-type image display apparatus.

What is claimed is:

1. A light source device comprising:
a solid light source;
a transmissive fluorescent plate including
a first region having a phosphor that is excited by excitation light supplied from the solid light source, the first region emitting fluorescent light from the phosphor and leakage excitation light not absorbed in the phosphor in a traveling direction of the excitation light from the solid light source, and a second region through which the excitation light from the solid light source passes; and a color filter plate including a third region that the fluorescent light and the leakage excitation light emitted from the first region of the transmissive fluorescent plate enter, a fourth region through which the excitation light from the second region of the transmissive fluorescent plate passes, and a first reflective film that is disposed on the third region and reflects the leakage excitation light to the first region as a return excitation light.

2. The light source device according to claim 1, wherein an optical system disposed from the transmissive fluorescent plate to the color filter plate forms a conjugate structure.

3. The light source device according to claim 1 further comprising an optical system that substantially collimates the light supplied from the transmissive fluorescent plate, wherein the light outgoing from the transmissive fluorescent plate enters substantially perpendicular to the color filter plate.

4. The light source device according to claim 1, wherein the transmissive fluorescent plate is formed of: a transparent substrate; a second reflective film that is disposed on the transparent substrate and transmits the excitation light and yet reflects light having a different wavelength from the excitation light; and a phosphor painted on the second reflective film, and wherein the phosphor transmits the excitation light incident on the phosphor at a given ratio.

5. A projector-type image display apparatus comprising:

the light source device as defined in claim 1;

a space conversion element that modulates illumination light supplied from the light source device with an image signal before emitting image light; and a projection optical system that magnifies and projects the image light supplied from the space conversion element.

6. The light source device according to claim 1, wherein the first reflective film reflects only the part of the excitation light.

7. The light source device according to claim 1, wherein the transmissive fluorescent plate and the color filter plate are controlled such that the fluorescent light and the leakage excitation light from the first region enter the third region of the color filter, and the excitation light from the second region of the transmissive fluorescent plate passes through the fourth region.

8. The light source device according to claim 1, wherein the fourth region is a light diffuser region creating blue reference light by diffusing the excitation light when the excitation light passes.

* * * * *